UNITED STATES PATENT OFFICE.

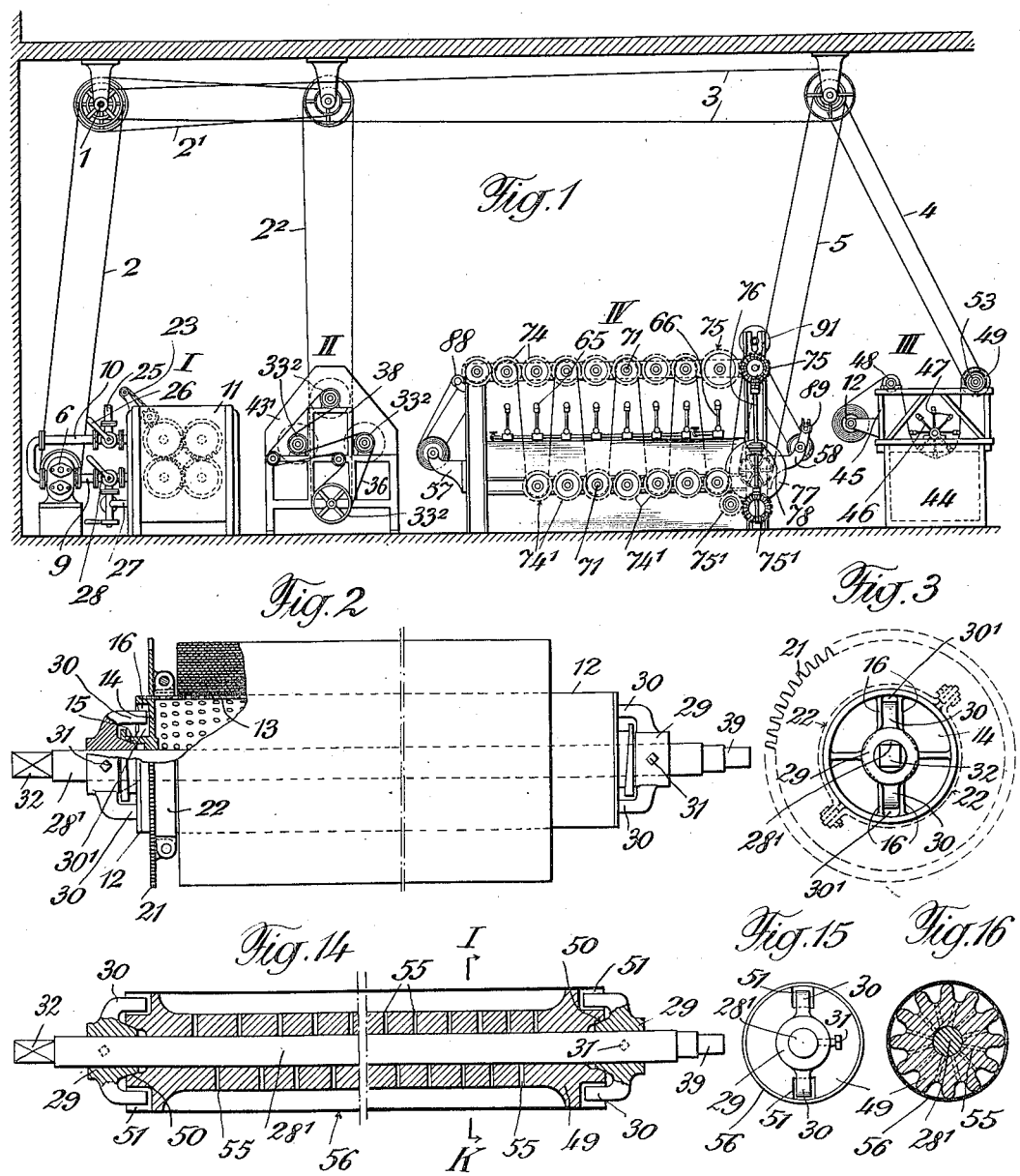

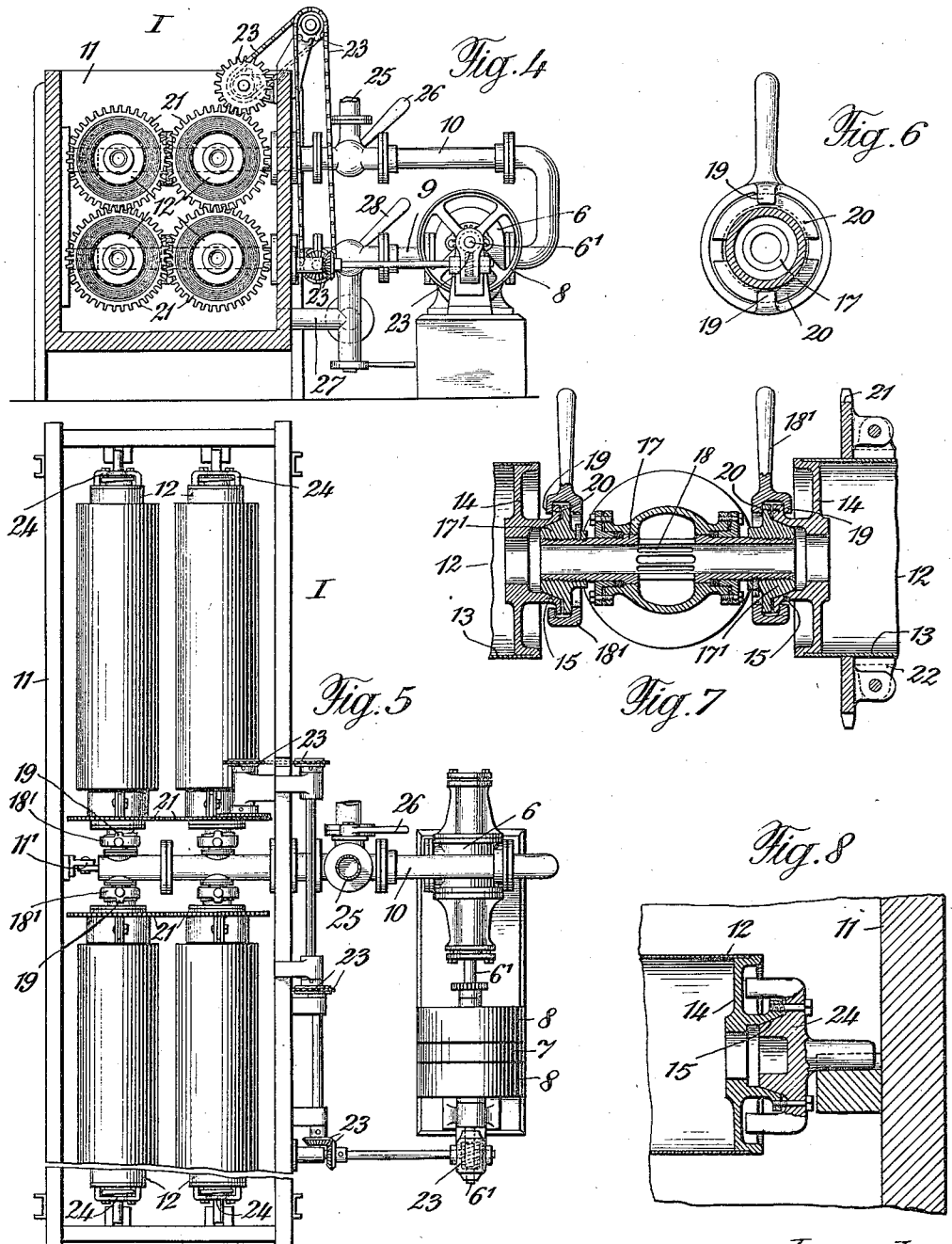

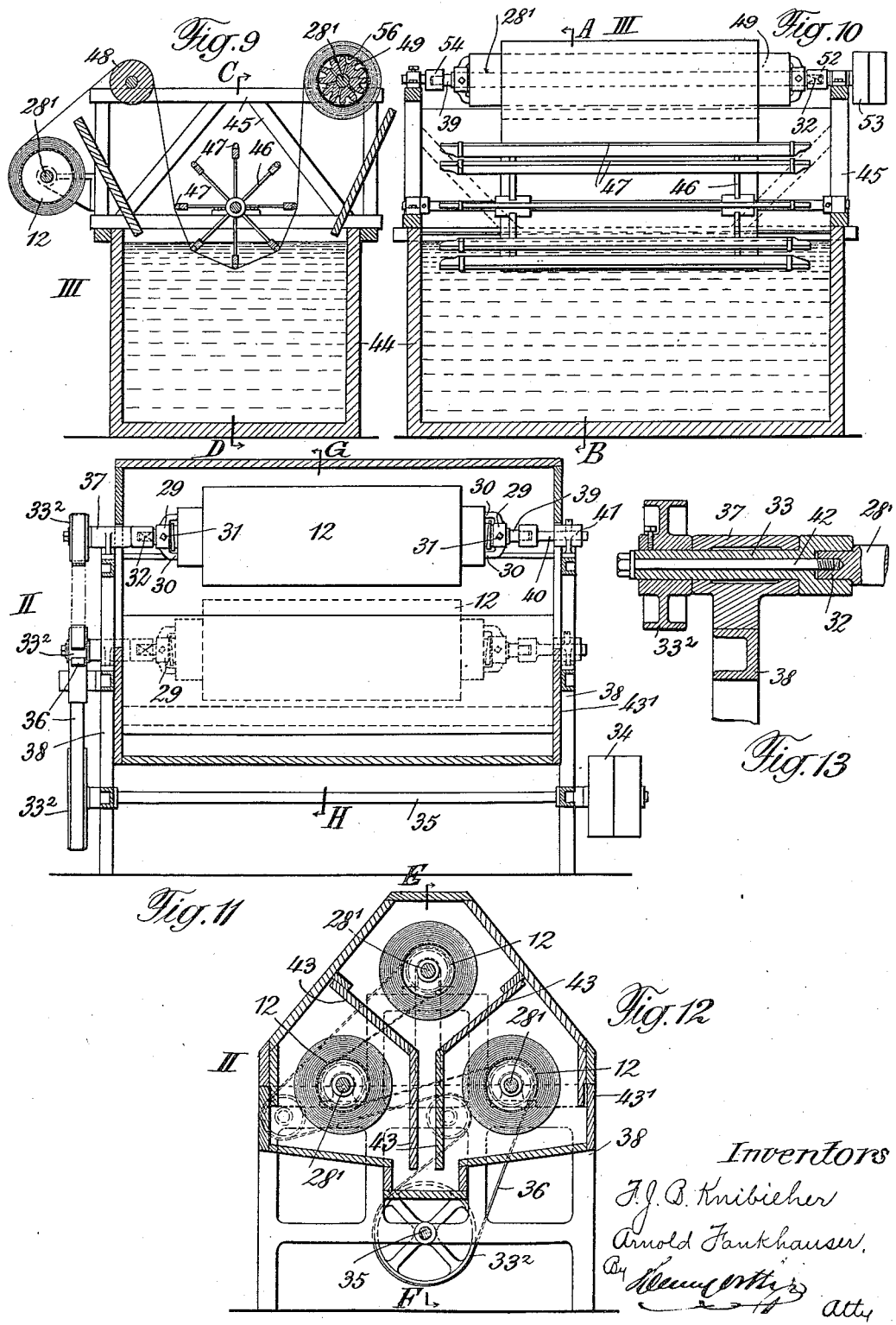

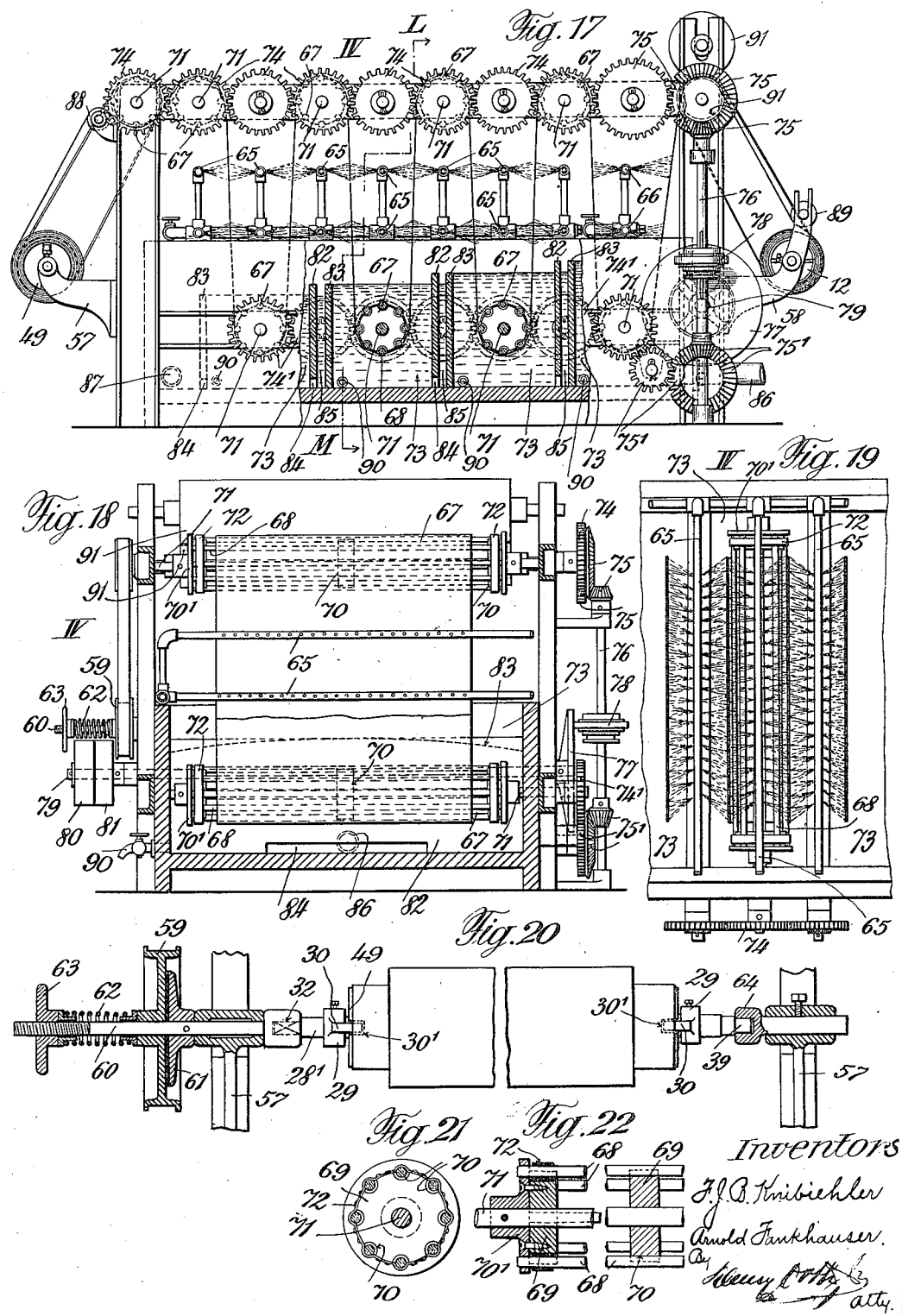

FRIEDRICH JOHANN BAPTIST KNIBIEHLER, OF WETTINGEN, AND ARNOLD FANKHAUSER, OF ENNETBADEN, SWITZERLAND, ASSIGNORS TO THE FIRM OF WEGMANN & CO., OF BADEN, SWITZERLAND.

PROCESS AND PLANT FOR THE TREATMENT OF FABRIC PIECES.

1,259,526. Specification of Letters Patent. Patented Mar. 19, 1918.

Application filed November 25, 1916. Serial No. 133,372.

*To all whom it may concern:*

Be it known, that we, FRIEDRICH JOHANN BAPTIST KNIBIEHLER, a citizen of the Republic of Switzerland, residing at Wettingen, Switzerland, and ARNOLD FANKHAUSER, a citizen of the Republic of Switzerland, residing at Ennetbaden, Switzerland, have invented certain new and useful Improvements in Processes and Plants for the Treatment of Fabric Pieces; and we do hereby declare the following to be a full, clear, and exact description of the invention, such as will enable others skilled in the art to which it appertains to make and use the same, reference being had to the accompanying drawings and to letters or figures of reference marked thereon, which form a part of this specification.

This invention relates to improvements in processes and plants for the treatment of fabric-pieces.

In carrying out, for instance, the hitherto known processes for charging silk-pieces and in using the machines constructed for this purpose great difficulties have to be overcome. This is mainly due to the fact that up to this day the machines and plants in which the charging process has to be carried out are not constructed in a suitable and advantageous manner. Particularly the stannic solutions to be used give rise to great difficulties, as such solutions corrode all metals and become then very rapidly useless. Moreover, nearly all operations had to be carried out hitherto by hand. Thus, for instance, the fabric-pieces are usually seized by means of cords and are then moved to and fro in the bath by hand or by means of bars or rods, or said pieces, while stretched transversely or twisted to a rope-like shape, are fed over reels, in order to be afterward folded and then dried in ordinary centrifugal drying machines.

Several qualities of silk-fabric are, however, so thin, that they cannot be seized by hand or folded, as in this case they would be oscillated and their threads would be shifted, the result of this being the formation of folds or crumples in the fabric. The difficulties to be overcome during the charging of such thin silk-pieces were, therefore, still greater and as a matter of fact it was quite impossible to charge up to this day very fine pieces of silk. Also the scouring and washing of fabric-pieces, which have been treated with stannic chlorid, could not always be carried out in a satisfactory manner, so that very frequently unequal charges and badly colored or dyed products were obtained.

The object of the present invention is now to devise a method and a plant for charging and treating in a similar manner all qualities of silk and eliminating all the drawbacks hereinbefore referred to.

The characteristic feature of the new method and the new plant consists in that the pieces of silk or the like have not to be seized by hand during the whole charging or similar treatment, and that said pieces are kept stretched transversely during the whole treatment by rolling them upon drums adapted to be put in the different devices of said plant.

The accompanying drawings illustrate by way of example a convenient mode of carrying into effect a plant according to this invention. While describing this plant we shall hereinafter explain at the same time the new method forming also a part of this invention.

In the drawings:

Figure 1 is a front elevation of the whole plant.

Fig. 2 is a front view partly in section of a drum for rolling up the fabric.

Fig. 3 is an end view of Fig. 2 seen from the left.

Fig. 4 is a front elevation partly in section of the sucking and pumping apparatus.

Fig. 5 is a plan view of Fig. 4.

Figs. 6–8 show details of this apparatus and of the drums carrying the fabric adapted to be set in this apparatus.

Fig. 9 is a section on the line A—B of Fig. 10 through the winding apparatus of the plant.

Fig. 10 is a section on the line C—D of Fig. 9.

Fig. 11 is a section on the line E—F of Fig. 12 through the centrifugal drying apparatus of the plant.

Fig. 12 is a section on the line G—H of Fig. 11.

Fig. 13 shows a detail of the drying apparatus.

Fig. 14 is a longitudinal section of a wooden drum for rolling up the fabric piece which has to be treated with stannic chlorid.

Fig. 15 is an end view of this drum.

Fig. 16 is a section on the line I—K of Fig. 14.

Fig. 17 is a front elevation partly in section of the washing machine of the plant.

Fig. 18 is a section on the line L—M of Fig. 17.

Fig. 19 is a plan view of a part of the washing machine.

Fig. 20 shows a friction drive for the drums adapted to be put in the washing machine, and Figs. 21 and 22 show details of the reels of the washing machine.

The plant shown by way of example in Fig. 1 comprises a sucking and pumping apparatus I, a centrifugal drying apparatus II, a winding apparatus III and a washing machine IV. All these apparatuses receive their drive from a main-driving shaft 1 by means of belt-drives 2 and $2^1$, $2^2$, 3, 4, 5 respectively.

6 denotes a pump (Figs. 4, 5) receiving its drive from a shaft $6^1$ carrying a loose pulley 7 and two fast pulleys 8. 9 denotes the suction pipe and 10 the delivery pipe of this pump. Pipes 9 and 10 extend into a reservoir 11, where they are supported at $11^1$ (Fig. 5). Within this reservoir 11 we connect as well to the suction pipe as to the delivery pipe four drums 12 in such a manner, that a drum 12 is connected to one of said pipes opposite another one of said drums 12.

Each drum 12 (see also Figs. 2 and 3) comprises a perforated, hollow metal cylinder 13. At both ends of the latter we provide heads 14 provided with a tapering bore 15 and with ribs 16 (Fig. 3).

At each place where two drums 12 are connected to the suction pipe or delivery pipe we provide a short pipe 17 (Fig. 7) passing at right angles through said suction or delivery pipe respectively. These pipes 17 are provided in their middle portion with longitudinal slots 18 and their ends are screw-threaded, so that rings $17^1$ projecting into the tapering bores 15 of the drums 12 may be rigidly connected to these pipes 17. $18^1$ denotes coupling members, which are adapted to effect a rigid connection between a pipe 17 and two drums 12 communicating with the latter as soon as projections 19 (Fig. 6) of said members $18^1$ are caused to work together with cams 20 provided on the heads 14. It is thus possible to provide a connection between the suction or delivery pipe of the pump and the interior of the drums 12, the arrangement being such, that said drums may be moved at the same time within the reservoir 11. To this end we provide on each drum 12 a disk 21 (Figs. 7, 2) provided at its circumference with teeth. To this disk is detachably connected a ring 22 consisting of two halves and covering that part of the perforated cylinder 13, which is not covered by the fabric rolled upon the drum 12. Owing to this, we are not obliged to use for each width of the fabric-pieces, which may vary within very wide limits, a special drum 12 having a corresponding perforation. On the contrary, by using suitable rings 22 it is possible to roll upon the same drum 12 silk-pieces having a width of about 60–100 and 100–140 cm.

The toothed disks 21 arranged on the same side of the delivery and suction pipes 9 and 10 respectively, are meshing in the manner shown in Fig. 4. The driving of the drums 12, which have to be rotated slowly during the working of the pump 6 is effected by the shaft $6^1$ by means of the members 23, one of which is operatively connected to one of the disks 21. Pipes 17 effect thereby the transmission of the motion from the drums 12 arranged on one side of the suction and delivery pipes 9, 10 respectively, to the drums 12 arranged on the other side of said pipes.

Into the second end of each drum 12 put in the reservoir 11 is inserted a bottom 24 (Fig. 8) acting at the same time as a support for the drum 12.

25 (Fig. 4) denotes a pipe, which upon a suitable adjustment of a valve by means of a lever 26 may effect a connection between a tank not shown and the pipe 10 for the purpose of filling the reservoir 11. A pipe 27 (Fig. 4) may effect a connection between the reservoir 11 and the pipe 9 upon a suitable adjustment of a lever 28 for the purpose of emptying the reservoir 11.

In the illustrated embodiment of the invention the centrifugal drying apparatus II shown on an enlarged scale in Figs. 11 and 12 is so constructed, that we may dispose in it at the same time three drums 12 for the purpose of drying the fabric rolled upon them.

In order that the drums 12 may be put in the drying apparatus we pass through each of them a shaft $28^1$ (Figs. 11, 2). To each end of such a shaft $28^1$ is fixed an adjustable driver 29. These drivers 29 comprise a bevel shaped part engaging with the correspondingly shaped bores 15 of heads 14. These drivers 29 are also provided with projections 30 (Figs. 2, 3) engaging with slots $30^1$ (Fig. 3) between the ribs 16 of the heads 14 and they may be fixed to the shaft $28^1$ by means of an adjusting screw 31. Each shaft $28^1$ has a square end 32 (Fig. 2).

33 (Figs. 13, 11) denotes gudgeons working together with the shafts $28^1$ and receiving their drive from a belt 36 (Fig. 11) passing over pulleys $33^2$. One of these pulleys $33^2$ is fixed to a shaft 35 carrying a fixed pulley 34 over which runs a driving belt $2^2$ (Fig. 1). Gudgeons 33 are mounted in bearings 37 (Fig. 13) fixed to the frame 38 of the centrifugal drying apparatus and they are provided with a bore for the square end 32 of shafts $28^1$. The other stepped end 39 (Figs. 2, 11) of each shaft $28^1$ of such a drum 12 put in the apparatus II is supported by a sleeve 40 adapted to be adjusted in a bearing 41. A screw bolt 42 (Fig. 13) passing through the gudgeon 33 and screwed into the square end 32 of the shaft $28^1$ prevents an axial displacement of the latter, and therefore also of the drum 12 mounted on this shaft, when the latter is set in motion within the apparatus II.

43 (Fig. 12) denotes partition walls provided in the interior of the casing $43^1$ of the centrifugal drying apparatus and separating the different rooms in which the fabric is dried by centrifugal action. Between the partition walls 43 we provide channels adapted to discharge the liquid set free upon a rotation of the drums 12 carrying the fabric to be dried. The partition walls 43 prevent the air current produced within the apparatus II from imparting to the liquid set free a circular motion, which would render the drying of the fabric more difficult.

We shall now describe the winding apparatus III shown on an enlarged scale in Figs. 9 and 10. We provide in the plant such a winding apparatus in order that the fabric may be rolled off the drums 12, used in the sucking and pumping apparatus and in the centrifugal drying apparatus, and wound upon a wooden drum, it having been found by experience that it is not possible to put metal drums with the fabric rolled upon them directly into a bath of stannic chlorid. In such a case the latter would very soon corrode the metal, so that it could no longer be used. Moreover, the stannic chlorid would be prevented from passing in an equal manner through the different layers of silk, so that the fabric would be charged and dyed in a very unequal manner.

The winding apparatus III comprises a tank 44 (Figs. 9 and 10) filled with stannic chlorid. On this tank 44 is mounted a frame 45 having two bearings (not shown) adapted to receive the ends 32 and 39 of a shaft $28^1$ passing through a drum 12. 46 denotes a wooden reel arranged above the middle of the tank 44 and provided with glass-rods 47 and dipping partly into the liquid contained in the tank 44. 48 denotes a roller serving to stretch the fabric passing over it in the transverse direction. 49 is the wooden drum (Figs. 9, 10, 14, 15, 16) around which the fabric has to be rolled. This drum is hollow and it is provided with longitudinal ribs. Each end of a drum 49 has a tapering bore 50 and slots 51 (Figs. 14, 15). A shaft $28^1$ may also be passed through each of these drums 49. In this case, the projections 30 of the drivers 29 fixed to the shaft $28^1$ engages with the slots 51 and effect a rotation of the drum 49 upon a rotation of shaft $28^1$. A sleeve 52 (Fig. 10), which may be rotated by means of a pulley 53 and belt 4 (Fig. 1), is adapted to act as a bearing for the square end 32 of the shaft $28^1$, while an adjustable sleeve 54 acts as a bearing for the stepped end 39 of the shaft $28^1$ carrying the drum 49.

The drum 49 has also radial bores 55 (Fig. 14) and in the embodiment shown we have rolled over this drum, for instance, a cloth 56 (Fig. 14).

The washing machine IV shown on a larger scale in Figs. 17–19 has on one side brackets 57 adapted to receive a wooden drum 49, from which the fabric has to be rolled off. On the opposite side of the machine there are provided brackets 58 adapted to receive a metal drum 12 upon which the washed or cleaned fabric has to be rolled. In order that the fabric to be passed through the machine is kept always stretched we provide for the actuation of these drums 49, 12—through each of which is passed a shaft $28^1$—a friction drive. Fig. 20 shows such a drive for the wooden drums 49 on an enlarged scale. This drive comprises a pulley 59, which is actuated in a manner described more fully later on. The pulley 59 is loose on a shaft 60 to which is fixed a disk 61. Shaft 60 has an enlarged end adapted to receive the square end 32 of the shaft $28^1$ passing through drum 49. A spring 62 presses the pulley 59 against the disk 61, so that it is able to effect a revolving movement of the drum 49. Owing to this arrangement, shaft 61 can carry out a movement relatively to the pulley 59 as soon as the tension in the fabric, which has to be passed through the washing machine, becomes too great. The pressure with which the pulley 59 is pressed toward the disk 61 may be adjusted by adjusting a hand wheel 63 working together with the screw-threaded end of shaft 60. The other end 39 of the shaft $28^1$ carrying the drum 49 rests in a sleeve 64 movably mounted in a bracket 57. The shaft $28^1$ carrying the metal drum 12 upon which the fabric to be passed through the washing machine has to be wound is mounted and actuated just in the same manner as the shaft $28^1$ carrying the wooden drum 49 from which the fabric has to be wound off.

65 denotes spraying-tubes supplying a part of the liquid, preferably water, with which the fabric has to be washed. In the embodiment of the washing machine illustrated in the drawings the group of spraying-tubes 66 provided in Fig. 17 on the right hand end of the machine is connected to another supply-pipe than the remaining tubes 65. 67 denotes glass-reels which prevent the fabric-band passed through the washing machine from being subjected to any friction and prevent said fabric from becoming damaged by the formation of stains or the corrosion of the metal. In order to prevent any breaking of the long glass-rods 68 of the reels 67 we provide for these rods near their ends and in their middle wooden rolls 69 (Figs. 21, 22, 18), having semicircular grooves 70 adapted to receive said rods 68. The recesses 70 are lined with woolen stuff. The ends of the rods 68 are moreover resting in special metallic guides 70¹ (Fig. 22) fixed to the shafts 71 of the reels 67. In order to give to the rods 68 a perfect hold we have wound in the embodiment shown around the two ends of the reels a woolen strap 72 (Fig. 22) fixed to the wooden rollers 69. Owing to the hereinbefore described mounting of the glass-rods 68 the latter may be arranged on the reels 67 at such a distance from each other, that the rod 68 just striking during the movement of its reel upon the silk- or fabric-band to be passed through the machine causes said fabric, which is stretched between two reels arranged one above another, to move in the direction or against the direction of the liquid-jets flowing out of the tubes 65, 66. Similarly, said rods 68 are also adapted to cause a movement of the fabric-band in the tanks 73 (Fig. 17), in which a part of the reels 67 is arranged and which are filled with liquid. Owing to this a quicker and more intensive washing or scouring of the fabric is obtained. As shown, the reels 67 are arranged in two horizontal rows. The reels arranged in the same row are operatively connected by means of toothed wheels 74 and 74¹ respectively, so that any undesired stretching of the fabric-pieces during the washing process is prevented, as all reels 67 may be moved at the same speed. Toothed wheels 74, 74¹ receive their drive from a shaft 76 by means of gearings 75 and 75¹ respectively. This shaft 76 actuates also by means of devices, which for the sake of clearness are not shown in drawings, the pulley 59 shown in Fig. 20. Shaft 76 receives its drive from a friction disk 77, which works together with a disk 78 fixed to the shaft 76. Disk 77 is fixed to a shaft 79 (Fig. 18) carrying a loose and fixed pulley 80 and 81 respectively, over one of which runs the belt 5 (Fig. 1).

In order to use as much as possible the water supplied to the washing machine, so that only dirty water flows out of the latter, the tanks 73 are so formed, that the right hand wall 82 (Fig. 17) of each of them is higher than their left hand wall 83. In the lower part of each wall 82 we provide a passage 84, while the upper edge of the walls 83 is arcuated in the manner shown in dotted lines in Fig. 18. Between two adjacent walls 82, 83 having the same vertical dimension we provide an interstice 85. The water flowing from the supply pipe 86 (Fig. 17) into the tank 73, which in Fig. 17 is on the right hand end of the machine, as well as the water falling from the spraying-pipes 65, 66 into these tanks 73 flows over the arcuated edges of the walls 83 into the interstices 85 and through the passage 84 into the next following tank 73 and flows then later on over the upper edge of the wall 83 of this tank. Finally, the liquid flows then into the tank 73, which in Fig. 17 is on the left hand side of the washing machine, from where it is discharged by means of the pipe 87 (Fig. 17). It will be seen, that the water is used each time anew in each tank 73.

88 and 89 denote rollers for stretching the fabric-band transversely, the first one being arranged on the fabric inlet side of the washing machine and the second one on the fabric outlet side. These rollers prevent any transverse shrinking of the silk-piece, so that any formation of folds is prevented. This is also the reason why we arrange the holes in the spraying-tubes 65, 66 obliquely relatively to the longitudinal axis of these tubes and why we give an arcuated shape to the upper edge of the walls 83. It will be seen, that owing to these measures the jets flowing out of the tubes 65, 66 and the liquid flowing through the tanks 73 have the tendency to stretch the fabric continuously in the transverse direction. In order to prevent a too strong current of the liquid in the tank 73 we provide on the latter regulating taps 90.

Let it be now assumed that there have to be charged in the hereinbefore described plant pieces of silk. In this case we proceed as follows:

The piece of silk to be charged is rolled at first in a suitable device not shown in the drawings, while not forming a part of the present invention, upon a metal drum 12. This drum is then put together with the three other drums 12 carrying also silk-pieces to be treated in the reservoir 11 of the sucking and pumping apparatus I, said reservoir 11 being filled with liquid. In this reservoir the four drums 12 are connected to the suction and delivery pipes 9 and 10 of the apparatus I and they are then slowly rotated for the purpose of preventing any part of the fabric from being subjected to a greater pressure than another part, which would be the case if the drums 12 would remain stationary in the reservoir 11, while the pump 6 is working. According as shaft 6¹ revolves in the one or other direction the liquid flows from the reservoir 11 through the silk-pieces into the drums 12 or from the interior of the drums 12 through said pieces into the reservoir 11.

The treatment of the silk-pieces in the sucking and pumping apparatus I has the effect to prepare and loosen the bast. In this apparatus the fabric may also be treated with acid, generally speaking the fabric is prepared in the apparatus I for the charging process. As soon as this is the case the drums 12 are taken out of the apparatus I and upon the removal of the bottoms 24 we pass through each of said drums a shaft $28^1$. Hereupon three drums 12 are put in the manner shown in Figs. 11 and 12 in the centrifugal drying apparatus, where they are fixed in the proper position by means of the bolts 42. For the purpose of drying the silk-pieces by means of centrifugal action we impart then to said drum 12 a very rapid revolving movement. As soon as this is accomplished, the drums 12 together with the shafts $28^1$ carrying the latter are removed from the centrifugal drying apparatus and put in the winding apparatus III. Each silk-piece is then wound off the metal drum 12 carrying it and it is fed over the roller 48 stretching it in the transverse direction, dipped beneath reel 46 into the solution of stannic chlorid contained in the tank 44 and finally rolled on the other side of apparatus III upon wooden drum 49. The latter rests on a shaft $28^1$. As soon as the whole piece has been wound upon the drum 49, shaft $28^1$ is pulled out of the latter, whereupon this drum together with the piece of silk wound over it is put into the solution contained in the tank 44 in order to complete the charging process. After some time has elapsed, the wooden drum 49 is again taken out of the bath; a shaft $28^1$ is passed through it and rigidly connected therewith, whereupon this drum together with the piece of silk carried by it is put in the centrifugal drying apparatus for the purpose of drying the silk. When this is the case, we bring such a wooden drum 49 together with the shaft $28^1$ passing through it into the washing machine, where the ends of shaft $28^1$ come to rest in the bearings 60 and 64 carried by the brackets 57. The silk-piece is then wound off this wooden drum and passed over the roller 88 stretching it in the transverse direction as well as over the different glass-reels 67. The silk is thereby dipped into the different tanks 73 and acted upon by jets flowing out of the spraying-tubes 65, 66. After that this piece of silk has been passed between two pressure-rollers 91 (Fig. 17) and acted upon by roller 89 stretching it in the transverse direction it is again rolled on the other side of the washing machine upon a perforated metal drum 12 through which is passed a shaft $28^1$. The piece of silk on the drum 12 is then again dried in the centrifugal drying apparatus II in order to be set afterward into the sucking and pumping apparatus I, where it may be further treated with phosphorus or washed, or subjected to the action of an acid, or that it may be treated afterward with further solutions of stannic chlorid or with silicates or soap and finally dyed.

It will be seen, that in carrying out the new process in the new plant it is not necessary to seize the silk-fabric during the whole charging process at any time by hand and that the fabric is kept always well stretched in the transverse direction, so that a shifting of the threads and the formation of holes or a tearing of the fabric is nearly excluded. On the other hand, the fabric is washed thoroughly.

We wish it to be understood, that instead of wooden drums we may use as well drums made of ebonite, card-board or similar acid-proof materials.

What we claim is:

1. The process of charging and the like of silk-pieces, which comprises preparing the fabric rolled upon a metal drum for the charging process, transferring said drum to a winding machine, rolling the fabric off the metal drum and rolling it upon a drum made of acid-proof material and simultaneously treating the fabric while being rolled upon the last mentioned drum with a charging bath, transferring the charged roll to a drier, drying the fabric wound upon this drum by means of centrifugal action, transferring the roll to a washing machine, and rolling this fabric upon a metal drum while it is simultaneously washed.

2. The process of charging and the like of silk-pieces, which consists in preparing the fabric rolled upon a metal drum for the charging process, transferring the drum to a winding machine, rolling the fabric off the metal drum and rolling it upon a drum made of acid-proof material while it is simultaneously passed through a charging bath, placing the drum of acid-proof material with the fabric wound thereon in a charging bath, transferring the latter drum to a drier, and drying the charged fabric on said drum by means of centrifugal action, then transferring said drum to a washing machine and rolling the fabric from the acid-proof drum upon a metal drum and washing the fabric while it is rolled upon this metal drum.

3. The process of charging and the like of silk-pieces, which consists in treating the fabric rolled upon a metal drum with a liquid for the purpose of preparing it for the charging process, transferring said drum with the fabric thereon to a drying machine, drying the prepared fabric by means of centrifugal action, transferring the drum to a winding machine, rolling the fabric off the metal drum and rolling it upon an acid-proof drum while the material is simultaneously treated with a charging bath, placing said acid-proof drum together with the fabric rolled thereon in a bath of stannic chlorid, transferring said drum and material to a drier, and drying the treated fabric by centrifugal action, transferring the drum to a winding machine and rolling the fabric again upon a metal drum in order that it may be subjected to further treatments, and washing the fabric while it is being wound from the drum of acid-proof material upon said last-mentioned metal drum.

4. The process of charging and the like of silk-pieces, which consists in pressing a liquid through the fabric rolled upon a metal drum for the purpose of preparing the fabric for the charging process, transferring the drum to a drying machine and drying the prepared fabric by means of centrifugal action, rolling the fabric off the metal drum and rolling it upon an acid-proof drum while the material is simultaneously treated with stannic chlorid, placing said acid-proof drum together with the fabric rolled upon it in a bath of stannic chlorid, transferring the drum to said drying machine and drying the fabric again by centrifugal action, transferring said drum from the drier to a washing machine, transferring the metal drum from the winding machine to a washing machine, rolling the fabric again upon a metal drum and washing the fabric while it is being unrolled from the drum of acid-proof material and rolled upon said last mentioned metal drum, transferring the metal drum to said drier and again drying the fabric wound upon said metal drum by centrifugal action, and repeatedly carrying out all the steps in the described sequence in order to attain the desired degree of charging.

5. The process of charging and loading, which comprises driving a liquid through silk fabric wound upon a metal drum preparatory to charging, transferring the drum with the fabric thereon to a drier and centrifugally drying the fabric, winding the fabric from the metal drum onto an acid-proof drum while treating it with stannic chlorid, transferring the latter drum to a stannic chlorid bath, returning the drum and material to the drier and transferring the drum and material to a washing machine and rewinding the material during washing onto the metal drum, and thereafter repeatedly phosphating, washing and treating with acid until the desired result is obtained.

6. A plant for charging and the like of silk-pieces, comprising a sucking and pumping apparatus, a centrifugal drying apparatus, a fabric-winding apparatus, a reservoir containing a bath of stannic chlorid, and a washing apparatus, all of said apparatuses being so constructed and correlated that the metal drums and acid-proof drums, upon which the fabric to be treated is rolled, may be taken out of one of said apparatus and put into another one.

In testimony that we claim the foregoing as our invention, we have signed our names in presence of two subscribing witnesses.

FRIEDRICH JOHANN BAPTIST KNIBIEHLER.
ARNOLD FANKHAUSER.

Witnesses:
   CARL GREBLER,
   ARNOLD LEHNER.